United States Patent
Galles et al.

(10) Patent No.: US 11,489,773 B2
(45) Date of Patent: *Nov. 1, 2022

(54) NETWORK SYSTEM INCLUDING MATCH PROCESSING UNIT FOR TABLE-BASED ACTIONS

(71) Applicant: Pensando Systems Inc., Milpitas, CA (US)

(72) Inventors: Michael Brian Galles, Los Altos, CA (US); David Clear, San Jose, CA (US)

(73) Assignee: Pensando Systems Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/761,659

(22) PCT Filed: Nov. 5, 2018

(86) PCT No.: PCT/US2018/059251
§ 371 (c)(1),
(2) Date: May 5, 2020

(87) PCT Pub. No.: WO2019/090247
PCT Pub. Date: May 9, 2019

(65) Prior Publication Data
US 2020/0336425 A1    Oct. 22, 2020

Related U.S. Application Data

(60) Provisional application No. 62/582,138, filed on Nov. 6, 2017.

(51) Int. Cl.
*H04L 45/745* (2022.01)

(52) U.S. Cl.
CPC ............................. *H04L 45/74591* (2022.05)

(58) Field of Classification Search
CPC ............ H04L 45/74591; H04L 45/745; H04L 45/7453; H04L 45/7457; H04L 47/50; H04L 49/109

See application file for complete search history.

(56) References Cited

U.S. PATENT DOCUMENTS 6,483,699 B1   11/2002   Salmonson et al.
6,906,920 B1    6/2005   Whitted et al.
(Continued)

FOREIGN PATENT DOCUMENTS

CN        1960335 A     5/2007
CN      102104541 A     6/2011
(Continued)

OTHER PUBLICATIONS

Bosshart et al. Forwarding Metamorphosis: Fast Programmable Match-Action Processing in Hardware for SDN. SIGCOMM' 13 Hong Kong, China Aug. 12-16, 2013 (Retrieved Apr. 23, 2019 from http://yuba.standford.edu/~grg/docs/sdn-chip-sigcomm-2013.pdf).
(Continued)

*Primary Examiner* — Chi H Pham
*Assistant Examiner* — Weibin Huang
(74) *Attorney, Agent, or Firm* — Patterson + Sheridan, LLP (57) ABSTRACT

Methods and devices for processing packets with reduced data stalls are provided. The method comprises: (a) receiving a packet comprising a header portion and a payload portion, wherein the header portion is used to generate a packet header vector; (b) producing a table result by performing packet match operations, wherein the table result is generated based at least in part on the packet header vector and data stored in a match table; (c) receiving, at a match processing unit, the table result and an address of a set of instructions associated with the match table; and (d) per-
(Continued)

forming, by the match processing unit, one or more actions in response to the set of instructions until completion of the instructions, wherein the one or more actions comprise modifying the header portion, updating memory based data structure or initiating an event.

26 Claims, 7 Drawing Sheets

(56) References Cited

U.S. PATENT DOCUMENTS

| | | | |
|---|---|---|---|
| 6,985,988 | B1 | 1/2006 | Nsame |
| 7,028,098 | B2 | 4/2006 | Mate et al. |
| 7,215,637 | B1 | 5/2007 | Ferguson et al. |
| 7,304,996 | B1 | 12/2007 | Swenson et al. |
| 7,409,476 | B1 | 8/2008 | Liang et al. |
| 7,418,536 | B2* | 8/2008 | Leung ............... H04L 45/54 712/19 |
| 7,567,567 | B2 | 7/2009 | Muller et al. |
| 7,975,094 | B2 | 7/2011 | Taylor et al. |
| 8,190,807 | B2 | 5/2012 | Reid et al. |
| 8,571,024 | B2 | 10/2013 | Tatar et al. |
| 9,071,504 | B2* | 6/2015 | Ashida ............... H04L 45/02 |
| 9,294,386 | B2 | 3/2016 | Narad |
| 9,712,439 | B2* | 7/2017 | Bosshart ............ H04L 45/745 |
| 9,826,067 | B2* | 11/2017 | Bosshart ............ H04L 45/74 |
| 9,826,071 | B2* | 11/2017 | Bosshart ............ H04L 69/22 |
| 9,891,898 | B1 | 2/2018 | Tonsing |
| 9,912,610 | B2* | 3/2018 | Bosshart ............ H04L 12/00 |
| 9,923,816 | B2* | 3/2018 | Kim ................... H04L 69/22 |
| 10,313,495 | B1* | 6/2019 | Bosshart ............ H04L 45/745 |
| 10,511,523 | B1* | 12/2019 | Bosshart ............ H04L 43/026 |
| 10,523,578 | B1* | 12/2019 | Li ...................... H04L 45/745 |
| 10,721,167 | B1* | 7/2020 | Bosshart ............ H04L 47/70 |
| 10,997,106 | B1 | 5/2021 | Bandaru et al. |
| 11,263,158 | B2* | 3/2022 | Galles ............... G06F 9/30101 |
| 2003/0229738 | A1 | 12/2003 | Zhuge et al. |
| 2008/0101016 | A1 | 5/2008 | Brooks et al. |
| 2008/0262990 | A1 | 10/2008 | Kapoor et al. |
| 2010/0165991 | A1 | 7/2010 | Veal et al. |
| 2011/0064084 | A1* | 3/2011 | Tatar ................. H04L 49/1546 370/392 |
| 2012/0207158 | A1 | 8/2012 | Srinivasan et al. |
| 2013/0058335 | A1* | 3/2013 | Koponen ............ H04L 45/00 370/392 |
| 2014/0025852 | A1 | 1/2014 | Ramakrishna et al. |
| 2014/0241361 | A1 | 8/2014 | Bosshart et al. |
| 2014/0241362 | A1 | 8/2014 | Bosshart et al. |
| 2014/0244966 | A1 | 8/2014 | Bosshart et al. |
| 2014/0328344 | A1 | 11/2014 | Bosshart |
| 2015/0304212 | A1 | 10/2015 | Zhou |
| 2017/0093986 | A1* | 3/2017 | Kim ................... H04L 12/00 |
| 2017/0093987 | A1 | 3/2017 | Sivaraman Kaushalram et al. |
| 2017/0237664 | A1 | 8/2017 | Jackson et al. |
| 2021/0103536 | A1* | 4/2021 | Galles ............... G06F 9/30079 |

FOREIGN PATENT DOCUMENTS

| | | |
|---|---|---|
| CN | 102238083 A | 11/2011 |
| WO | WO-2019090247 A1 | 5/2019 |
| WO | WO-2019164827 A1 | 8/2019 |

OTHER PUBLICATIONS

PCT/US2018/059251 International Search Report and Written Opinion dated Feb. 13, 2019.
PCT/US2019/018544 International Search Report and Written Opinion dated May 22, 2019.
Shiomoto. Research Challenges for Network Function Virtualization—Re-Architecting Middlebox for High Performance and Efficient, Elastic and Resilient Platform to Create New Services. IEICE Transactions on Communications E101-B(1):96-122 (2018).
U.S. Appl. No. 16/971,898 Office Action dated Mar. 18, 2021.
Bosshart et al.: P4: Programming protocol-independent packet processors. ACM SIGCOMM Computer Communication Review 44(3):87-95 URL: https://dl.acm.org/doi/10.1145/2656877.2656890 (2014).
Sivaraman et al..: DC.p4: programming the forwarding plane of a data-center switch. SOSR 2015: Proceedings of the 1st ACM SIGCOMM Symposium on Software Defined Networking Research Jun. 2015 Article No. 2, pp. 1-8 URL: https://doi.org/10.1145/2774993.2775007 (2015).

* cited by examiner

NETWORK SYSTEM INCLUDING MATCH PROCESSING UNIT FOR TABLE-BASED ACTIONS

CROSS-REFERENCE TO RELATED APPLICATIONS

This application is the National Stage entry of International Application No. PCT/US2018/059251, filed Nov. 5, 2018, which claims the priority and benefit of U.S. Provisional Application No. 62/582,138 filed Nov. 6, 2017, Entitled: NETWORK SYSTEM INCLUDING MATCH PROCESSING UNIT FOR TABLE-BASED ACTIONS, the entire contents of which are incorporated herein by reference in their entirety.

BACKGROUND OF THE INVENTION

In a data communication network, network or routing devices receive messages at one of a set of input interfaces and forward them on to one or more of a set of output interfaces. Users typically require that such routing devices operate as quickly as possible in order to keep pace with a high rate of incoming messages.

Hardware switches when combined with specialized hardware functions provide network capabilities including packet switching, security, deep packet inspection, and other capabilities. For example, network processing units (NPUs) and standard CPUs are used to process packets in a programmable fashion. NPUs are a domain specific version of a CPU; both designs essentially load a packet for processing into a buffer or memory, and then execute instructions to manipulate packet fields as well as lookup table data to direct packet forwarding and rewrite operations.

SUMMARY OF THE INVENTION

It has been a challenge for network switches or functions to be capable of performing packet processing in a programmable fashion without sacrificing performance. A primary reason that NPUs and CPUs fail to meet targeted packet processing rates when applying new or complex features is that they spend many cycles stalled waiting for data reads to return from table, state, or packet memory.

Data fetch stalls are common when the NPU or CPU need to look up data in a large shared table, for example forwarding database tables or connection state tables. Data fetch stalls are often the primary source of processing stalls. The overall throughput of the network processors might be limited where the processors "stall" waiting for packet data to be become available for processing when using memory, particularly memories external to the NPU, to communicate between the hardware accelerators and the processors. For example, if a processor core tries to access memory addresses which are not in its cache and the memory system has to access other memory (e.g., dynamic random access memory (DRAM)) to get them, it may cause the processor core to stall for hundreds of processor clock cycles per address to wait for the memory system to deliver the requested data to the processor core. In another example, an external memory might include two or more substructures (e.g., multiple banks of DRAM). In such a system, a latency penalty might be incurred for multiple access requests to the same memory substructure. Additionally, a given set of operations for a data flow might be required to be completed in a given order, further adding to latency.

Therefore, there exists a need for systems and methods that can allow a highly configurable network pipeline, a customizable host interface, and flexible hardware offloads for storage, security, and network functions with improved performance and within target power budgets. The present invention addresses this need and provides related advantages as well.

The subject matter disclosed herein meets this need by breaking down a packet processing task into a series of table lookups or matches, accompanied by processing actions. A match processing unit (MPU) may be provided to perform the table-based actions in each stage of a network pipeline. One or more MPUs may be combined with a table engine, which is configured to extract a programmable set of fields and fetch a table result. Once the table engine has completed fetching the lookup result, it may deliver the table result and relevant packet header fields to an MPU for processing. The MPU may run a targeted program based on a domain specific instruction set and the MPU may take the table lookup result and packet headers as inputs and produce table updates and packet header rewrite operations as outputs. A pre-determined number of such table engines and MPU pipeline stages may be combined to form a programmable pipeline which is capable of operating at a high rate of packet processing. This prevents the MPUs from experiencing a data miss stall, and allows the MPU programs executed in a deterministic time, then pipelined together to maintain a target packet processing rate. In some cases, the programmer or compiler may decompose the packet processing program into a set of dependent or independent table lookup and action processing stages (match+action) which are mapped onto the table engine and MPU stages respectively. In some instances, if the required number of stages exceeds the implemented number of stages, a packet may be recirculated for additional processing.

Accordingly, in one aspect, disclosed herein are methods for processing packets with reduced data stalls, the method comprising: (a) receiving a packet comprising a header portion and a payload portion, wherein the header portion comprises a packet header vector; (b) generating a table result by performing packet match operations, wherein the table result is generated based at least in part on the packet header vector and data stored in a match table; (c) receiving, at a match processing unit, the table result and an address of a set of instructions associated with the match table; and (d) performing, by the match processing unit, one or more actions in response to the set of instructions until completion of the instructions, wherein the one or more actions comprise modifying the header portion, updating memory based data structure or initiating an event.

In some embodiments, the method further comprises providing the modified header portion to a succeeding circuit, wherein the succeeding circuit is configured to assemble the modified header portion to the corresponding payload portion. In some embodiments, performing packet match operations comprises selecting a match table from a plurality of tables stored on a random-access memory (RAM). In some cases, the match table is selected based on packet type information related to a packet type associated with the header portion. Alternatively, the match table is selected based on an ID of the match table selected by a previous stage or previous pipelined stages.

In some embodiments, the table result comprises a key related to the match table and the match result of the match operation. In some embodiments, the memory unit of the match processing unit is configured to store a plurality of sets of instructions. In some cases, the plurality sets of instructions are associated with different actions. In some cases, a set of instructions is stored in a contiguous region of the memory unit, and the contiguous region is identified by the address.

In some embodiments, the one or more actions further comprise updating the match table. In some embodiments, the method further comprises locking the match table while the match table is processed by the match processing unit.

In another aspect, an apparatus for processing packets is provided. The apparatus may comprise: (a) a first memory unit having a plurality of programs stored thereon, wherein the plurality of programs are associated with a plurality of actions comprising modifying a header portion of a packet, updating memory based data structure or initiating an event; (b) a second memory unit for receiving and storing a table result, wherein the table result is produced by performing packet match operations to a packet header vector contained in the header portion and data stored in a match table; and (c) circuitry for executing a program selected from the plurality of programs in response to an address received by the apparatus and the table result, wherein the program is executed until completion and the program is associated with the match table.

In some embodiments, the apparatus is configured to provide the modified header portion to a succeeding circuit and the succeeding circuit is configured to assemble the modified header portion to the corresponding payload portion.

In some embodiments, the table result is provided by a table engine which table engine comprising a circuitry for selecting a match table from a plurality of tables stored on a random-access memory (RAM). In some cases, the match table is selected based on packet type information related to a packet type associated with the header portion. Alternatively, the match table is selected based on an ID of the match table selected by a previous stage.

In some embodiments, each of the plurality of programs comprises a set of instructions stored in a contiguous region of the first memory unit, and the contiguous region is identified by the address. In some embodiments, the one or more actions comprise updating the match table. In some embodiments, the circuitry is further configured to lock the match table while the match table is processed by the apparatus. In some cases, the event is not related to modifying the header portion of the packet. In some cases, the memory based data structure comprises at least one of the following: management token, administrative command, processing tokens for initiating an event.

In some embodiments, system comprising a plurality of the apparatuses is provided. The plurality of apparatuses is coordinated to perform the set of instructions or one or more actions concurrently or sequentially according to a configuration. In some case, the configuration is determined by an application instruction received from a main memory of a host device operably coupled to the plurality of apparatuses.

It shall be understood that different aspects of the invention can be appreciated individually, collectively, or in combination with each other. Various aspects of the invention described herein may be applied to any of the particular applications set forth below or for any other types of the data processing system disclosed herein. Any description herein concerning the data processing may apply to and be used for any other data processing situations. Additionally, any embodiments disclosed in the context of the data processing system or apparatuses are also applicable to the methods disclosed herein.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Described herein, in certain embodiments, are disclosed herein are network apparatuses, systems, and methods for processing data, such as packets or tables, with reduced data stalls.

Certain Definitions

Unless otherwise defined, all technical terms used herein have the same meaning as commonly understood by one of ordinary skill in the art to which this invention belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit," "block" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Moreover, the word "exemplary" where used herein to means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Embodiments of the invention may be used in a variety of applications. Some embodiments of the invention may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, a wireless communication station, a wireless communication device, a wireless access point (AP), a modem, a network, a wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards, units and/or devices which are part of the above networks, one way and/or two-way radio communication systems, cellular radio-telephone communication systems, a cellular telephone, a wireless telephone, a personal communication systems (PCS) device, a PDA device which incorporates a wireless communication device, a multiple input multiple output (MIMO) transceiver or device, a single input multiple output (SIMO) transceiver or device, a multiple input single output (MISO) transceiver or device, or the like.

The term "data stalling" or "stall" can refer to all forms of stalling introducing a delay before a processor can resume execution. For example, cache miss stalls may occur when a cache line cannot be found by a processor. In another example, to prevent new instructions from being fetched when an instruction in the decoding stage has been stalled, the value in the PC register and the instruction in the fetch stage are preserved to prevent changes. The values are preserved until the bubble has passed through the execution stage. In another example, when a processor core tries to access memory addresses which are not in its cache and the memory system has to access other memory (e.g., dynamic random access memory (DRAM)) to get them, it may cause the processor core to stall for hundreds of processor clock cycles per address to wait for the memory system to deliver the requested data to the processor core.

The term "table" refers to a variety types of tables involved in data or packet processing. For example, the table may be match tables used in the match+action stages, such as forwarding tables (e.g., hash tables for Ethernet address lookup, the longest-prefix match tables for IPv4 or IPv6, wildcard lookups for Access Control Lists (ACLs)). These tables may be stored in various memory locations such as in internal static random access memory (SRAM), network interface card (NIC) DRAM, or host memory.

The term "match+action" refers to the paradig for network packet switching (such as those performed by an OpenFlow switch or P4 pipeline, which uses match tables, action tables, statistics memories, meters memories, stateful memories, and ternary indirection memories). The term "P4" referes to a high-level language for programming protocol-independent packet processors. P4 is a declarative language for expressing how packets are processed by the pipeline of a network forwarding element such as a switch, NIC, router or network function appliance. It is based upon an abstract forwarding model consisting of a parser and a set of match+action table resources, divided between ingress and egress. The parser identifies the headers present in each incoming packet. Each match+action table performs a lookup on a subset of header fields and applies the actions corresponding to the first match within each table.

While portions of this disclosure, for demonstrative purposes, refer to wired and/or wired communication systems or methods, embodiments of the invention are not limited in this regard. As an example, one or more wired communication systems, can utilize one or more wireless communication components, one or more wireless communication methods or protocols, or the like.

Although some portions of the discussion herein may relate, for demonstrative purposes, to a fast or high-speed interconnect infrastructure, to a fast or high-speed interconnect component or adapter with OS (operating system) bypass capabilities, to a fast or high-speed interconnect card or Network Interface Card (NIC) with OS bypass capabilities, or to a to a fast or high-speed interconnect infrastructure or fabric, embodiments of the invention are not limited in this regard, and may be used in conjunction with other infrastructures, fabrics, components, adapters, host channel adapters, cards or NICs, which may or may not necessarily be fast or high-speed or with OS bypass capabilities. For example, some embodiments of the invention may be utilized in conjunction with InfiniBand (IB) infrastructures, fabrics, components, adapters, host channel adapters, cards or NICs; with Ethernet infrastructures, fabrics, components, adapters, host channel adapters, cards or NICs; with gigabit Ethernet (GEth) infrastructures, fabrics, components, adapters, host channel adapters, cards or NICs; with infrastructures, fabrics, components, adapters, host channel adapters, cards or NICs that have OS with infrastructures, fabrics, components, adapters, host channel adapters, cards or NICs that allow a user mode application to directly access such hardware and bypassing a call to the operating system (namely, with OS bypass capabilities); with infrastructures, fabrics, components, adapters, host channel adapters, cards or NICs; with infrastructures, fabrics, components, adapters, host channel adapters, cards or NICs that are connectionless and/or stateless; and/or other suitable hardware.

Match Processing Unit (MPU)

In an aspect of the invention, a match processing unit (MPU) is provided to process a data structure. The data structure may comprise various types such as data packet, a management token, administrative command from a host, a processing token. The MPU may be configured to perform various operations according to the type of data being processed or different purposes. For example, the operations may include table-based actions for processing packets, table maintenance operations such as writing a timestamp to a table or harvesting table data for export, administrative operations such as creating new queues or memory maps, gathering statistics, and various other operations such as initiating a bulk data processing that may result in writing any type of modified data to the host memory.

In some embodiments, the MPU provided for processing packets may comprise: (a) a first memory unit having a plurality of programs stored thereon, wherein the plurality of programs are associated with a plurality of actions comprising modifying a header portion of a packet, updating memory based data structure or initiating an event; (b) a second memory unit for receiving and storing a table result, and the table result is provided by a table engine configured to perform packet match operations to a packet header vector contained in the header portion and data stored in a match table; and (c) circuitry for executing a program selected from the plurality of programs in response to an address received by the apparatus and the table result, and the program is executed until completion and the program is associated with the match table. As mentioned above, the event may or may not relate to modifying or updating a packet. For instance, the event may be administrative operations such as creating new queues or memory maps, gathering statistics, initiating a bulk data processing that may result in writing any type of modified data to the host memory, or performing calculations on descriptor rings, scatter gather lists (SGLs).

Figure 1:
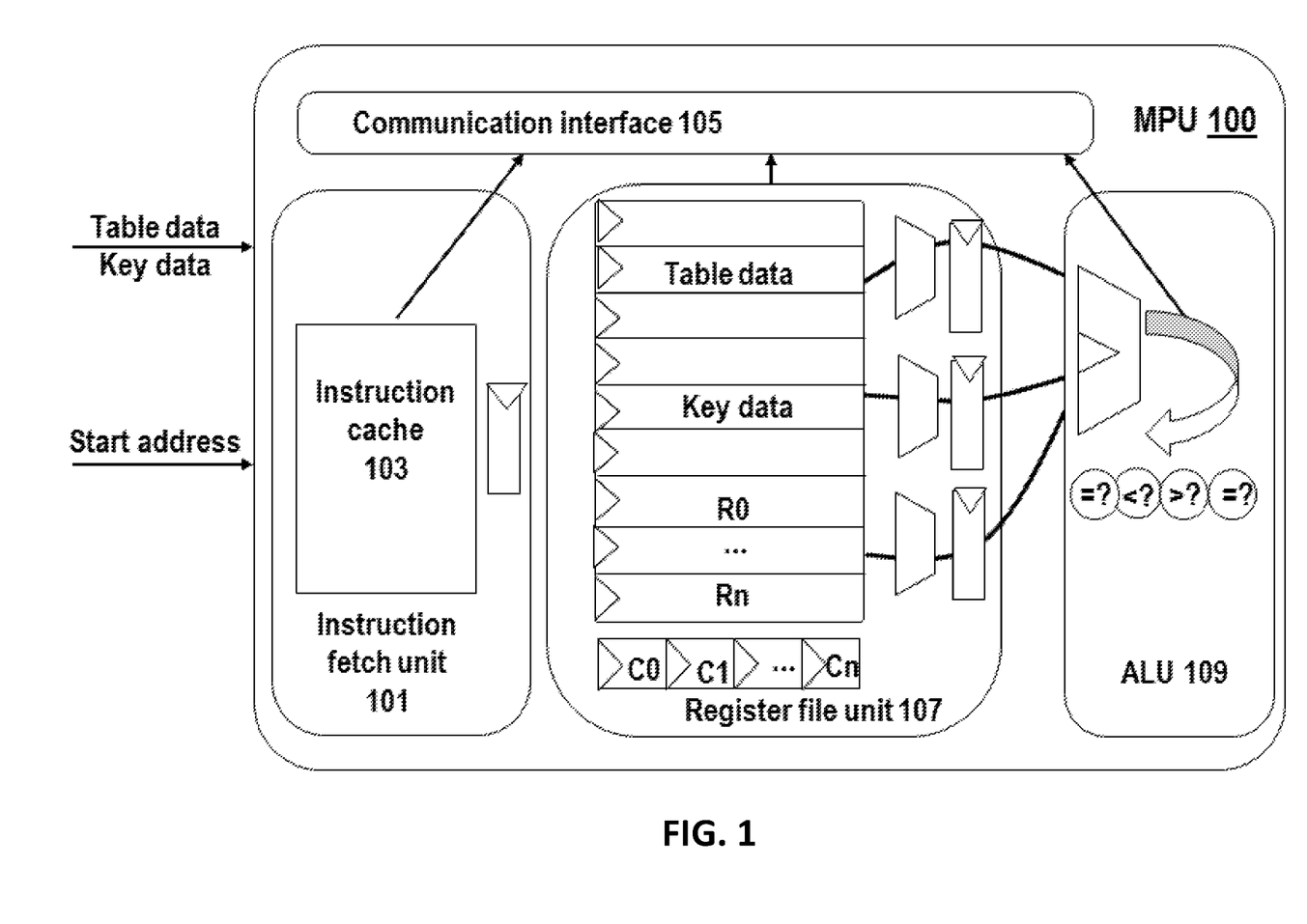
FIG. 1 shows a block diagram of a match processing unit (MPU) in accordance with embodiments of the invention.

FIG. 1 shows a block diagram of a match processing unit (MPU) 100, in accordance with embodiments of the invention. In some embodiments, the MPU unit 100 may comprise multiple functional units, memories and at least a register file. For example, the MPU unit may comprise an instruction fetch unit 101, a register file unit 107, a communication interface 105, arithmetic logic units (ALUs) 109 and various other functional units.

In the illustrated example, the MPU unit 100 may comprise a write port or communication interface 105 allowing for memory read/write operations. For instance, the communication interface may support packets written to or read from an external memory (e.g., high bandwidth memory (HBM) of a host device) or an internal static random access memory (SRAM). The communication interface 105 may employ any suitable protocol such as Advanced Microcontroller Bus Architecture (AMBA) Advanced extensible Interface (AXI) protocol. AXI is a bus protocol for a high-speed/high-end on-chip bus protocol and has channels associated with read, write, address, and write response, which are respectively separated, individually operated, and have transaction properties such as multiple-outstanding address or write data interleaving. The AXI interface 105 may include features that support for unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long they do not write to the same byte. In some cases, dirty bytes in the table need not be contiguous and the MPU may only write back a table if at least one bit in the dirty vector is set. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as Advanced High-performance Bus (AHB) protocol or Advanced Peripheral Bus (APB) protocol in addition to the AXI protocol.

The MPU 100 may comprise an instruction fetch unit 101 configured to fetch instruction set from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. Details about the table engine are described later herein. In some embodiments, the instruction fetch unit 101 may comprise an instruction cache 103 for storing one or more programs. In some cases, the one or more programs may be loaded into the instruction cache 103 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 105. This provides flexibility to allow for executing different programs associated with different types of data using the same processing unit. In an example, when a management packet header vector (PHV) injected into the pipeline, for example to perform administrative table direct memory access (DMA) operations or entry aging functions (i.e., adding timestamps), one of the management MPU programs may be loaded to the instruction cache to execute the management function. The instruction cache 103 can be implemented using various types of memories such as one or more SRAMs.

The one or more programs can be any programs such as P4 programs related to reading table, building headers, DMA to/from memory regions in HBM or in the host device and various other actions. The one or more programs can be executed in any stage of a pipeline as described elsewhere herein.

The MPU 100 may comprise a register file unit 107 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 107 may comprise a plurality of general purpose registers (e.g., R0, R1, ... Rn) which may be initially loaded with metadata values then later used to store temporary variables within execution of a program until completion of the program. For example, the register file unit 107 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In one embodiment, each register of the register file is 64 bits and may be initially loaded with special metadata values such as hash value from table, lookup, packet size, PHV timestamp, programmable table constant and the like, respectively.

In some embodiments, the register file unit 107 may also comprise comparator flags unit (e.g., C0, C1, . . . Cn) configured to store comparator flags. The comparator flags can be set by calculation results generated by the ALU which in return is compared with constant values in an encoded instruction to determine a conditional branch instruction. In an embodiment, the MPU may comprise eight one-bit comparator flags. However, it should be noted that MPU may comprise any number of comparator flag units each of which may have any suitable length.

The MPU 100 may comprise one or more functional units such as the ALU 109. The ALU may support arithmetic and logical operations on the values stored in the register file unit 107. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, the ALU may be configured to perform calculations on descriptor rings, scatter gather lists (SGLs), and control data structures loaded into the general purpose registers from the host memory.

The MPU 100 may comprise various other functional units such as meters, counters, action insert unit and the like. For example, the ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be remarked as a result of overflowing the base band. This information might be used later to direct the packet to a different queue, where it may be more subject to delay or dropping in case of congestion. The counter may be implemented by the MPU instructions. The MPU may comprise one or more types of counters for different purposes. For example, the MPU may comprise performance counters to count MPU stalls. The action insert unit may be configured to push the register file result back to the PHV for header field modifications.

The MPU may be capable of locking a table. In some case, a table being processed by a MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table addresses, for example, one for the previous table write-back and another address lock for the current MPU program.

MPU Pipelining

In some embodiments, a single MPU may be configured to execute instructions of a program until completion of the program. Alternatively or additionally, multiple MPUs may be configured to execute a program. In some embodiments, a table result may be distributed to multiple MPUs. The table result may be distributed to multiple MPUs according to a MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 2:
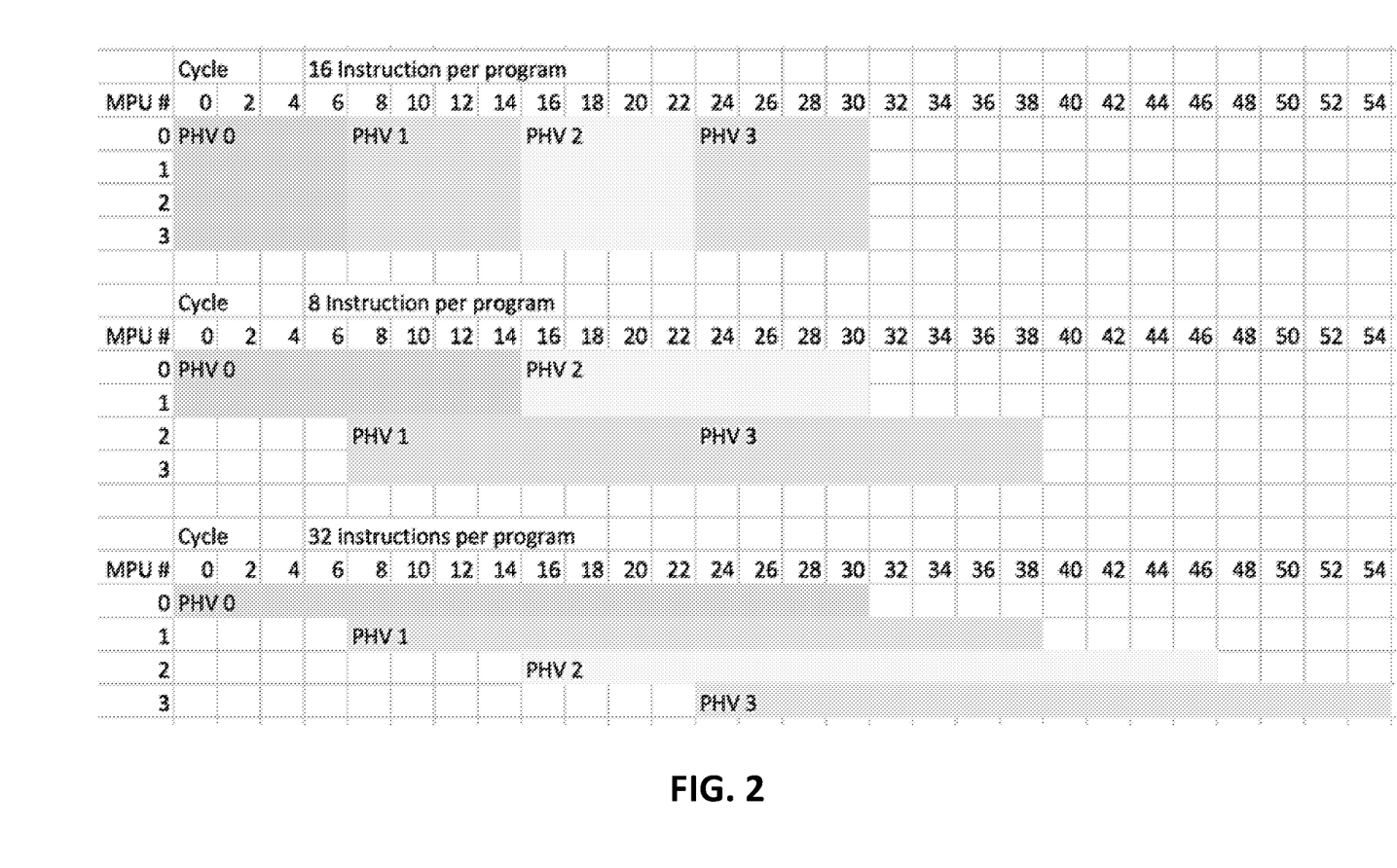
FIG. 2 shows exemplary configurations of multiples MPUs for executing a program.

FIG. 2 shows exemplary configurations of multiples MPUs for executing a program. Any number of MPUs may be used for executing a program in order to meet a desirable performance. For instance, at least two, three, four, five, six, seven, eight, nine, or ten MPUs may be used to execute a program. Each MPU may execute at least a portion of the program or a subset of the instruction set. The multiple MPUs may perform the execution simultaneously or sequentially. Each MPU may or may not perform the same number of instructions. Examples shown in FIG. 2 are for illustrative purpose only, and it should be readily known that various other configurations can be employed. As shown in the figure, the first scenario shows that four MPUs execute a 16 instructions long program concurrently. In this case, the table result may be distributed to the four MPUs in the beginning and the result of a proceeding stage may be distributed among the four MPUs. The second and third scenarios correspond to an 8-instruction long program and 32-instruction long program respectively. In each scenario, the four MPUs may run at different cycles and may not be used to process the same table concurrently. The configurations may be determined according to the length of program (i.e., number of instructions, cycles) and/or number of available MPUs. In some case, the configuration may be determined by an application instruction received from a main memory of a host device operably coupled to the plurality of MPUs.

P4 Pipelines

Figure 3:
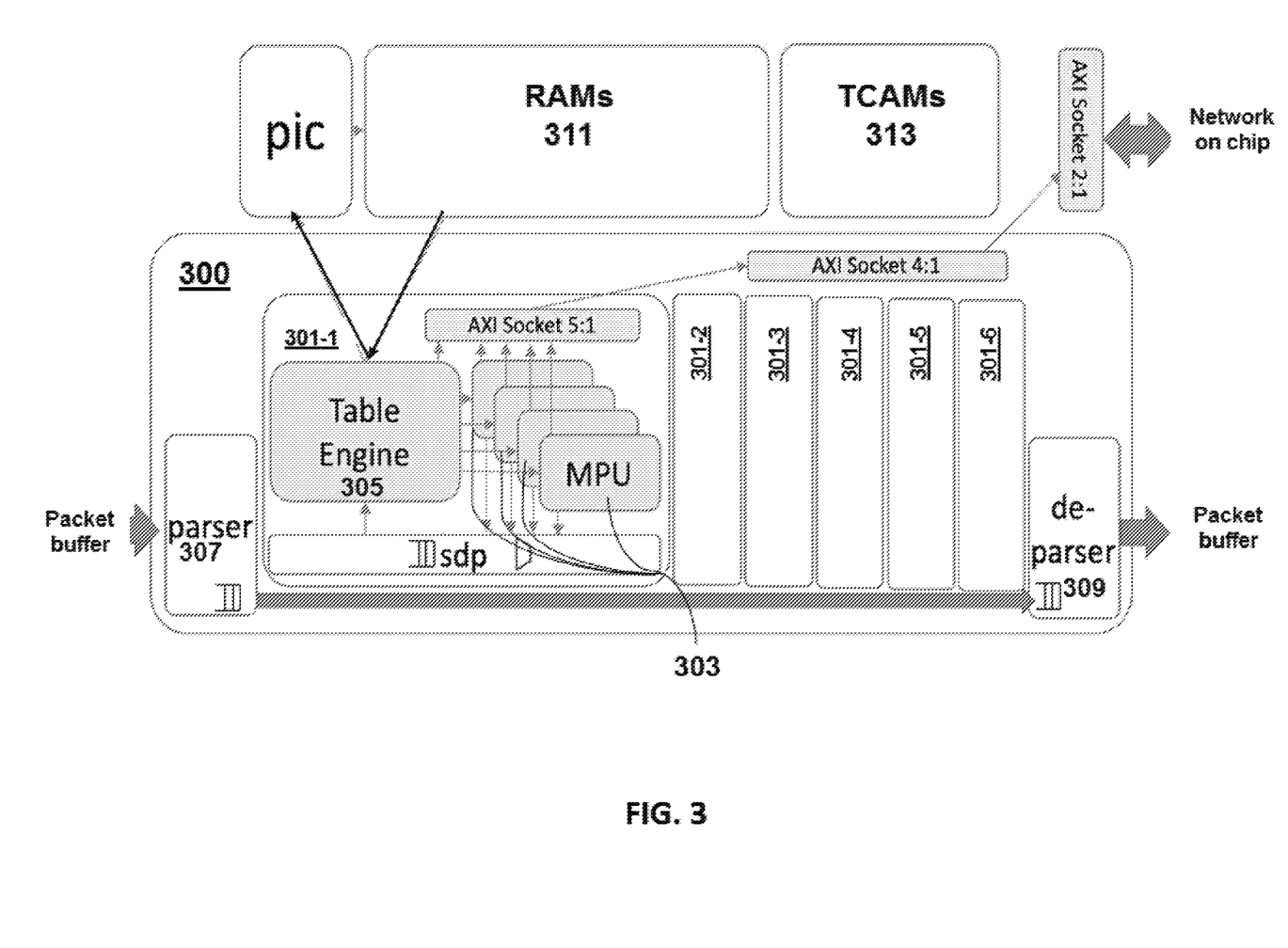
FIG. 3 shows block diagram of an exemplary P4 ingress or egress pipeline (PIP pipeline), in accordance with embodiments of the invention.

In one aspect, a flexible, high performance match action pipeline which can execute a wide range of P4 programs is provided. The P4 pipeline can be programmed to provide various features, including, but not limited to, routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attack detection, mitigation, telemetry data gathering on any packet field or flow state and various others. FIG. 3 shows a block diagram of an exemplary P4 ingress or egress pipeline (PIP pipeline) 300 in accordance with embodiments of the invention.

In some embodiments, the provided invention may support a match+action pipeline. The programmer or compiler may decompose the packet processing program into a set of dependent or independent table lookup and action processing stages (i.e., match+action) which are mapped onto the table engine and MPU stages respectively. The match+action pipeline may comprise a plurality of stages. For example, a packet entering the pipeline may be first parsed by a parser (e.g., parser 307) according to the packet header stack specified by a P4 program. This parsed representation of the packet may be referred to as parsed header vector. The parsed header vector may then be passed through stages (e.g., stages 301-1, 301-2, 301-3, 301-4, 301-5, 301-6) of ingress match+action pipeline, wherein each stage is configured to match one or more parsed header vector fields to tables, then updates the packet header vector (PHV) and/or table entries according to the actions specified by the P4 program. In some instances, if the required number of stages exceeds the implemented number of stages, a packet may be recirculated for additional processing. In some cases, the packet payload may travel in a separate first-in-first-out (FIFO) queue until it is reassembled with its PHV in the de-parser (e.g., de-parser 309). The de-parser may rewrite the original packet according to the PHV fields which have been modified (e.g., added, removed, or updated). In some cases, the packet processed by the ingress pipeline may be placed in a packet buffer for scheduling and possible replication. In some cases, once the packet is scheduled and leaves the packet buffer, it may be parsed again to create an egress parsed header vector. The egress parsed header vector may be passed through a sequence of stages of match+action pipeline in a similar fashion of the ingress match+action pipeline, after which a final de-parser operation may be3 executed before the packet is sent to its destination interface or recirculated for additional processing.

In some embodiments, the ingress pipeline and egress pipeline may be implemented using the same physical block or processing unit pipeline. In some embodiments, the PIP pipeline 300 may comprise at least one parser 307 and at least one de-parser 309. The PIP pipeline 300 may comprise multiple parsers and/or multiple de-parsers. The parser and/or de-parser may be a P4 compliant programmable parser or de-parser. In some cases, the parser may be configured to extract packet header fields according to P4 header definitions and place them in the packet header vector (PHV). The parser may select from any fields within the packet and align the information from the selected fields to create a packet header vector. In some cases, after passing through a pipeline of match+action stages, the de-parser block may be configured to rewrite the original packet according to the updated PHV.

The packet header vector (PHV) produced by the parser may have any size or length. For example, the PHV may be a least 512 bits, 256 bits, 128 bits, 64 bits, 32 bits, 8 bits or 4 bits. In some cases, when a long PHV (e.g., 6 Kb) is desired to contain all relevant header fields and metadata, a single PHV may be time division multiplexed (TDM) across several cycles. This TDM capability provides benefit allowing the described invention to support variable length PHVs, including very long PHVs to enable complex features. A PHV length may vary as the packet passes through the match+action stages.

The PIP pipeline may comprise a plurality of match+action stages. After the parser 307 produces the PHV, the PHV may be passed through the ingress match+action stages. In some embodiments, the PIP pipeline may be implemented using multiple stage units 301-1, 301-2, 301-3, 301-4, 301-5, 301-6, each of which may comprise a table engine 305 and multiple MPUs 303. The MPU 303 can be same as the MPU as described in FIG. 1. In the illustrated example, four MPUs are used in one stage unit. However, any other number of MPUs, such as at least one, two, three, four, five, six, seven, eight, nine, or ten can be utilized or grouped with a table engine.

A table engine 305 may be configured to support per-stage table match. For example, the table engine 305 may be configured to hash, lookup, and/or compare keys to table entries. The table engine 305 may be configured to control table match process by controlling the address and size of the table, PHV fields to use as a lookup key, and MPU instruction vector which defines the P4 program associated with the table. A table result produced by the table engine may be distributed to the multiple MPUs 303.

The table engine 305 may be configured to control a table selection. In some cases, upon entering a stage, the PHV may be examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on packet type or protocols (e.g., Internet Protocol version 4 (IPv4), Internet Protocol version 6 (IPv6) and Multiprotocol Label Switching (MPLS)) or the next table ID as determined by the preceding stage. In some cases, the incoming PHV may be analyzed by the table selection logic, which then generates a table selection key and compares the result using a TCAM to select the active tables. The table selection Key may be used to drive table hash generation, table data comparison, and associated data into the MPUs.

In some embodiments, the table engine 305 may comprise a hash generation unit. The hash generation unit may be configured to generate a hash result off a PHV input and the hash result may be used to conduct a DMA read from a DRAM or SRAM array. In an example, the input to the hash generation unit may be masked according to which bits in the table selection key contribute to the hash entropy. In some cases, the same mask may be used by the table engine for comparison with the returning SRAM read data. In some instances, the hash result may be scaled according to the table size, then the table base offset may be added to create the memory index. The memory index may be sent to the DRAM or SRAM array and to perform the read.

In some cases, the table engine 305 may comprise a TCAM control unit. The TCAM control unit may be configured to allocate memory to store multiple TCAM search tables. In an example, a PHV table selection key may be directed to a TCAM search stage before a SRAM lookup. TCAM search tables can be configured to be up to 1024 bits wide and as deep as TCAM resources permit. In some cases, multiple TCAM tables may be carved from the shared quadrant TCAM resources. The TCAM control unit may be configured to allocate TCAMs to individual stages so that to prevent TCAM resource conflicts, or allocate TCAM into multiple search tables within a stage. The TCAM search index results may be forwarded to the table engine for SRAM lookups.

The table engine 305 may be implemented by hardware or circuitry. The table engine may be hardware defined. In some cases, the results of table lookups or table results are provided to the MPU in its register file.

The PIP pipeline 300 may comprise multiple stage units 301-1, 301-2, 301-3, 301-4, 301-5, 301-6. The PIP pipeline may comprise any number of stage units such as at least two, three, four, five, six, seven, eight, nine, ten sage units that can be used within the PIP pipeline. In the illustrated example, six match+action stages units 301-1, 301-2, 301-3, 301-4, 301-5, 301-6 are grouped into a set. The set of stages units may share a common set of SRAMs 311 and TCAMs 313. The SRAMs 311 and TCAMs 313 may be component of the PIP pipeline. This arrangement may allow the six stage units to divide match table resources in any suitable proportion which provides convenience to the compiler and easing the complier's task of resource mapping. Any suitable number of SRAM resources and any suitable number of TCAM resources may be used by each PIP pipeline. For example, the illustrated PIP pipeline may be coupled to ten SRAM resources and four or eight TCAM resources. In some instances, TCAMs may be fused vertically or horizontally for a wider or deeper search.

Extended P4 Pipelines

The provided invention may support an extended P4 programmable pipeline to allow for direct interfacing with the host driver. For example, the P4 programmed DMA interfaces may be directly coupled to the host virtual functions (VFs) as well as advanced RISC machine (ARM) CPU or offload engine interfaces. The extended P4 pipeline may handle required DMA operations and loops. The extended P4 pipeline may include features, including but not limited to, stateless NIC offloads such as TCP segmentation offload (TSO) and Receive Side Scaling (RSS); storage exchange table-style transaction servicing in the extended P4 pipeline; fine grained load balancing decisions that can be extended to individual data structures of performance critical applications, such as DPDK or key value matching; TCP flow termination and initiation for proxy services; RDMA over converged Ethernet (RoCE) and similar remote direct memory access (RDMA) protocol support; custom descriptor and SGL formats can be specified in P4 to match data structures of performance critical applications; new device and VF behaviors can be modelled using P4 programs coupled with host driver development, and various other features.

Data may be transmitted between the packetized domain in the P4 pipeline to/from the memory transaction domain in the host and NIC memory systems. This packet to memory transaction conversion may be performed by the extended P4 pipelines that include DMA write (TxDMA) and/or DMA read (RxDMA) operations. The extended P4 pipeline includes TxDMA may also be referred to as Tx P4 and the extended P4 pipeline includes RxDMA may also be referred to as Rx P4 throughout this specification. The extended P4 pipelines may comprise the same match+action stages in the P4 pipeline, and a payload DMA stage at the end of the pipeline. The DMA stage is configured to execute DMA commands in order. Packets may be segmented or reassembled into data buffers or memory regions (e.g., RDMA registered memory) according to the extended P4 programs. The payload DMA stage may be a P4 extension which enables the programmable P4 network pipeline extended to the host memory system and driver interface. This P4 extension allows custom data structures and applications interactions to be tailored to application or container needs.

A stage of an extended P4 pipeline may include multiple programmable tables which may exist in SRAM, NIC DRAM, or host memory. Host memory structures may include descriptor rings, SGLs, and control data structures which can be read into the register file unit of the MPU for calculations. The MPU may add PHV commands to control DMA operations to and from host and NIC memory, and insert DMA commands into the PHV for execution by the payload DMA stage. The extended P4 programs may include, for example, completion queue events, interrupts, timer set, and control register writes and various others programs.

Figure 4:
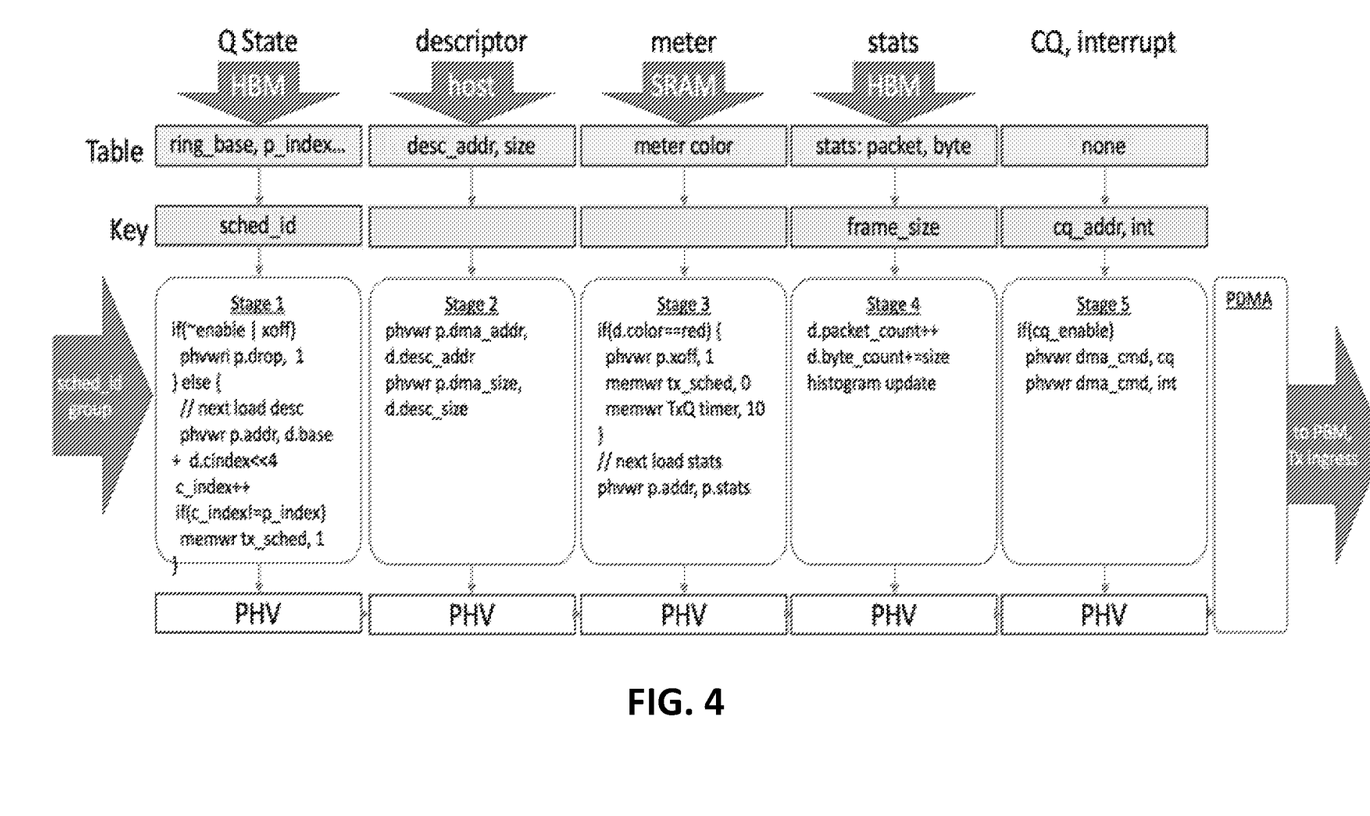
FIG. 4 illustrates an exemplary extended pipeline of stages for Ethernet packet transmission (i.e., Tx P4 pipeline)

FIG. 4 illustrates an exemplary extended pipeline of stages for Ethernet packet transmission (i.e., Tx P4 pipeline). As shown in the example, a table engine of stage 1 may fetch the queue state (e.g., Q state) table for processing by the MPUs of stage 1. In some cases, the queue state may also contain an instruction offset address based on the type of queue pairs in order to speed MPU processing. Other separate Tx P4 programs can be written for an Ethernet Tx queue, an RDMA command queue, or any new type of transmit DMA behavior customized to a particular application. The number of supported Tx queue pairs may be determined based on hardware scheduler resources assigned to each queue pair. As mentioned above, the PHV may be passed through each stage in which match+action programs may be executed by the stage unit associated therewith. The MPU of the final stage (e.g., stage 5) may insert DMA commands into the PHV for execution by the payload DMA stage (e.g., PDMA).

Figure 5:
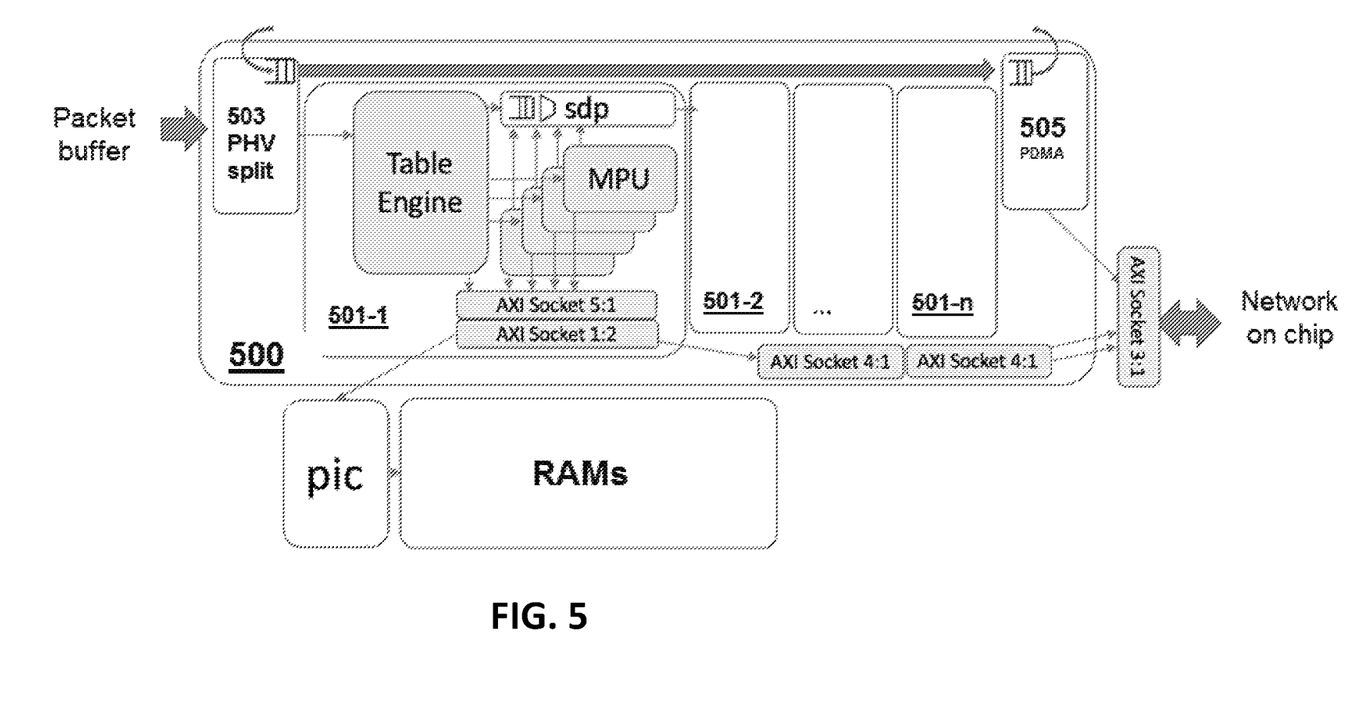
FIG. 5 shows a block diagram of an exemplary Rx P4 pipeline, in accordance with embodiments of the invention.
Figure 6:
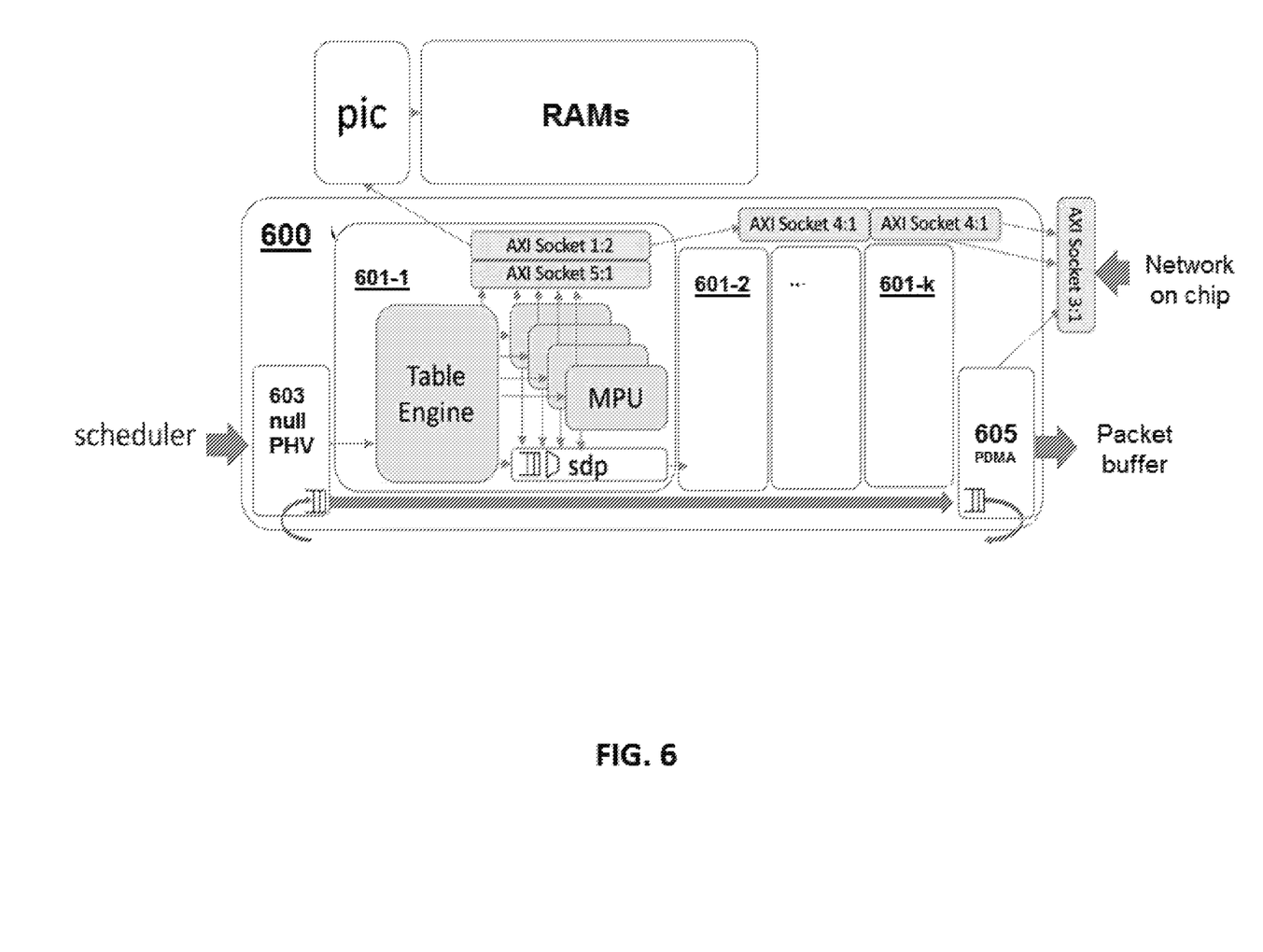
FIG. 6 shows a block diagram of an exemplary Tx P4 pipeline in accordance with embodiments of the invention.

FIG. 5 and FIG. 6 show exemplary Rx P4 pipeline 500 and Rx P4 pipeline 600 in accordance with embodiments of the invention. The Rx P4 stages and/or Tx P4 stages may be generally similar to the P4 pipeline stages as described elsewhere herein with a few different features. In some cases, the extended P4 stages may not use TCAM resources and may use less SRAM resources than P4 stages. In some cases, the extended P4 pipeline may comprise different number of stages than the P4 pipeline, by having a payload DMA stage at the end of the pipeline. In some cases, the extended P4 pipeline may have a local PHV recirculate data path that may not use packet buffer.

Referring to the Rx P4 pipeline (i.e., RxDMA P4 pipeline) as shown in FIG. 5, the Rx P4 pipeline may comprise multiple stage units 501-1, 501-2, . . . 501-$n$ each of which may have the same physical block of the stage unit as described in FIG. 3. The number of stage units in the Rx P4 pipeline may or may not be the same as the number of stage units of a P4 pipeline as mentioned above. In an example, a packet may be passed to the Rx P4 pipeline from a P4 networking pipeline which may include P4 forwarding, isolation, multicast, L4 security, and other network features.

In some embodiments, the Rx P4 pipeline 500 may comprise a PHV splitter block 503 configured to generate an RxDMA PHV. For example, the metadata fields of the PHV (e.g., logical interfaces (LIF) ID) as required by the RxDMA may be passed from the P4 network pipeline through the packet buffer as a contiguous block of fields prepended to the packet. Before entering the first stage of RxDMA P4 pipeline, the PHV splitter block 503 may extract the prepended metadata and place it in the RxDMA PHV. The PHV splitter block 503 may maintain a count of number of PHVs that are currently in the RxDMA pipeline, as well as a count of number of packet payload bytes that are in the pipeline. In some cases, when either the PHV count or the total packet byte count exceeds a high water mark, the PHV splitter block 503 may stop accepting new packets from the packet buffer. This provides benefit to ensure that packets recirculated from the payload DMA block 505 have priority to be processed and exit the pipeline.

The Rx P4 pipeline may comprise a packet DMA block 505 configured to control ordering between dependent events. The packet DMA block may also be referred to as payload DMA block. As described above, the payload DMA block may include a payload DMA engine. A packet data may be sent in a FIFO to the packet DMA block 505 to await DMA commands created in the Rx P4 pipeline. The DMA commands may be created by the MPU as described elsewhere herein. The packet DMA block at the end of the Rx P4 pipeline may execute the packet DMA write commands, DMA completion queue (CQ) write commands, interrupt assertion writes, and doorbell writes in the order the DMA commands are placed in the PHV. DMA commands can be placed anywhere in a PHV. In some cases, the DMA commands generated in the Rx P4 pipeline may be arranged in a contiguous space such that the commands can be executed in order as long as the first command and the last command are indicated. For instance, the first DMA command may be pointed to by an intrinsic PHV field and subsequent DMA commands may be placed contiguous within the PHV, where the last DMA command may be indicated by the another intrinsic PHV field. In some cases, the order may not be maintained between some of the DMA commands. For example, the order between memory to memory command and non-memory to memory commands may not be maintained. This is beneficial to prevent memory to memory read latency from blocking the packet processing commands.

Referring to the Tx P4 pipeline 600 shown in FIG. 6, the Tx P4 pipeline may comprise multiple stage units 601-1, 601-2, . . . 601-k each of which may have the same physical block of the stage unit as described in FIG. 5. The number of stage units in the Tx P4 pipeline may or may not be the same as the number of stage units of an Rx P4 pipeline as described above. In an example, packets may be transmitted from a host or NIC memory using the Tx P4 pipeline. The Tx queue scheduler may select the next queue for service and submits the LIF, QID to the beginning of the Tx P4 pipeline.

The Tx P4 pipeline may comprise a null PHV block 603 configured to generate address to be read by the table engine in stage 0. The null PHV block 603 may also insert information such as LIF or LIF type to the intrinsic fields of the PHV. The null PHV block 603 may also insert recirculated PHVs back into the pipeline from the last stage of the Tx P4 pipeline, as well as insert software generated PHVs. The Tx P4 pipeline may comprise a packet DMA block 605 similar to the packet DMA block as described in FIG. 5. In some embodiments, the DMA commands generated in a Tx P4 pipeline may be arranged in a contiguous space such that the commands can be executed in order as long as the first command and the last command are indicated.

In some embodiments, Tx DMA pipeline, Rx DMA pipeline, and P4 pipeline may be capable of inserting software generated PHVs before the first stage of the respective pipeline. Software may use generated PHVs to launch MPU programs, perform table modifications, or launch DMA commands from the extended P4 pipeline.

In an aspect, a system comprising the Tx DMA pipeline, Rx DMA pipeline, and P4 pipeline and other components may be provided. The system may support extended P4 pipeline based host interface features (e.g., DMA operations and loops), provide improved network performance (e.g., increased MMPS with reduced data stalls), fault detection and isolation, P4 based network features (e.g., routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attach detection, mitigation, telemetry data gathering on any packet field or flow state), security features and various others.

Figure 7:
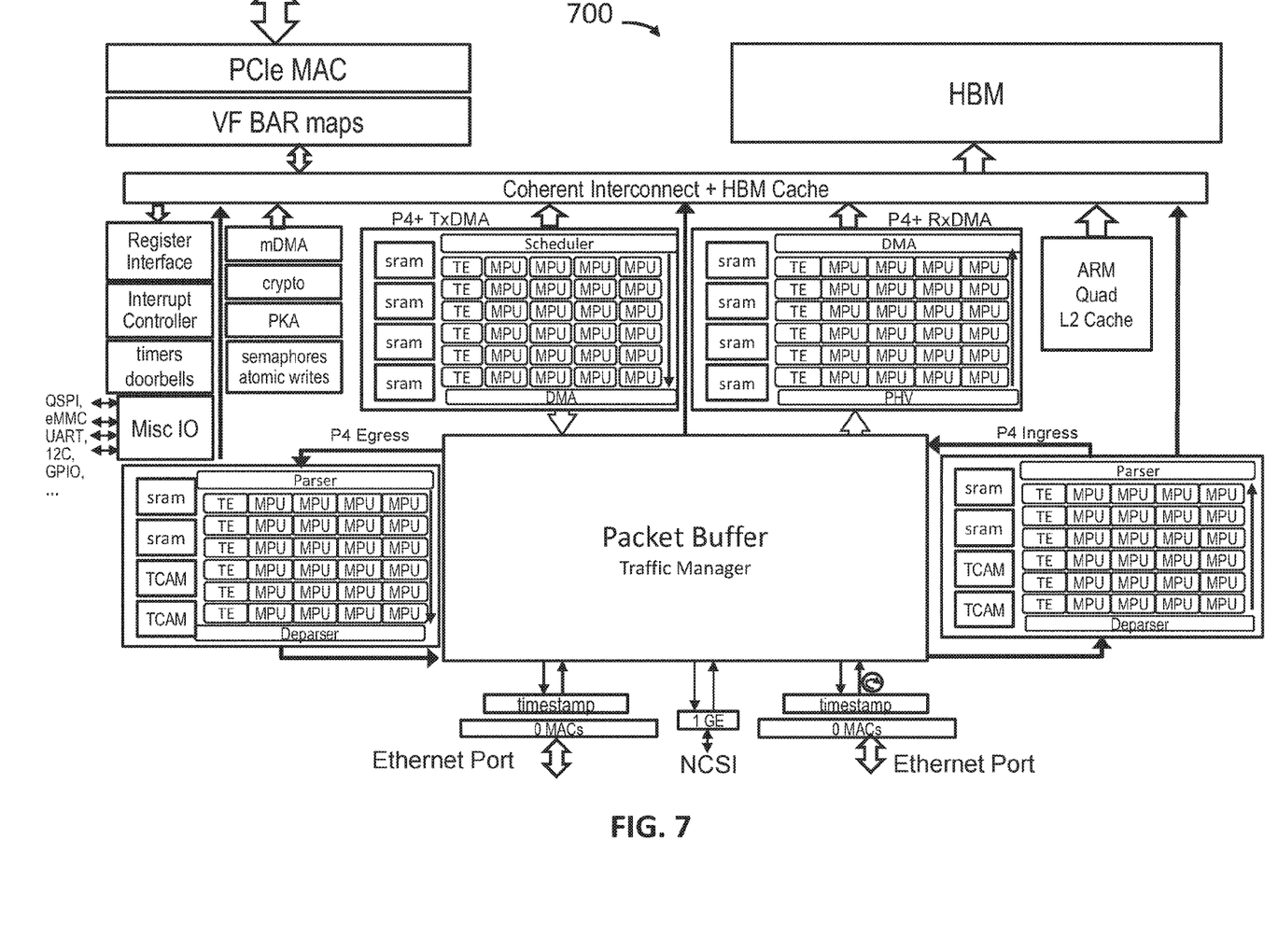
FIG. 7 shows a block diagram of an exemplary system in accordance with embodiments of the invention.

FIG. 7 shows a block diagram of an exemplary system 700, in accordance with embodiments of the invention. The system 700 serves as an example of implementing the P4 and extended P4 pipelines and various other functions to provide an improved network performance. As shown in the figures, the system 700 may comprise four advanced RISC machine (ARM) processors with coherent L1 and L2 caches, a shared local memory system, flash non-volatile memory, DMA engines, and miscellaneous 10 devices for operation and debug. The ARM processors may observe and control all NIC resources via an address map. The ARM processor may implement the P4 pipeline and the extended P4 pipeline as described elsewhere herein. The host interface block may also observe regions of this address space via PCIe BAR maps to expose NIC functions to the host. In an example, the address map may be initially created according to the Principles of ARM Memory Maps, ARM Limited, which provides SOC addressing guidelines for a 34-bit memory map.

All memory transactions in the system 700, including host memory, high bandwidth memory (HBM), and registers may be connected via a coherent network on a chip (NOC) based on IP from an external Systems. The NOC may provide cache coherent interconnect between the NOC masters, including P4 pipeline, extended P4 pipeline, DMA, PCIe, and ARM. The interconnect may distribute HBM memory transactions across a plurality (e.g., 16) of HBM interfaces using a programmable hash algorithm. All traffic targeting HBM may be stored in the NOC cache (e.g., 1 MB cache). The NOC cache may be kept coherent with the ARM caches. The NOC cache may be used to aggregate HBM write transactions which may be smaller than the cache line (e.g., size of 64 bytes), as the HBM is not efficient when processing small writes. The NOC cache may have high bandwidth, supporting up to 3.2 Tb/s operation as it fronts the 1.6 Tb/s HBM.

The system may an internal HBM memory system for running Linux, storing large data structures such as flow tables and other analytics, and providing buffering resources for advanced features including TCP termination and proxy, deep packet inspection, storage offloads, and connected FPGA functions. The memory system may comprise a HBM module which may support 4 GB capacity or 8 GB capacity, depending on package and HBM.

It is noted that various embodiments can be used in conjunction with one or more types of wireless or wired communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, ZigBee™, or the like. Embodiments of the invention may be used in various other devices, systems, and/or networks.

While preferred embodiments of the present subject matter have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the subject matter described herein may be employed in practicing the invention.

What is claimed is:

1. A method for processing packets comprising:
   a) receiving a packet comprising a header portion and a payload portion, wherein the header portion is used to generate a packet header vector;
   b) selecting, from a plurality of tables, a match table based at least in part on (i) packet type information or protocol information associated with the packet header vector, or (ii) a table selection key;
   c) producing a table result by performing packet match operations, wherein the table result is generated based at least in part on the packet header vector and data stored in the match table selected in (b);
   d) receiving, at a match processing unit, the table result and an address of a set of instructions associated with the match table; and
   e) performing, by the match processing unit, one or more actions according to the set of instructions until completion of the instructions, wherein the one or more actions comprise modifying the header portion, updating a memory based data structure, and/or initiating an event.

2. The method of claim 1, further comprising providing the modified header portion to a succeeding circuit, wherein the succeeding circuit is configured to assemble the modified header portion to the payload portion.

3. The method of claim 1, wherein the plurality of tables are stored on a random-access memory (RAM) or a ternary content addressable memory (TCAM).

4. The method of claim 1, wherein the match table is selected based on an ID of the match table selected by a preceding stage in a programmed pipeline for processing the packet.

5. The method of claim 1, wherein a memory unit of the match processing unit is configured to store a plurality of sets of instructions.

6. The method of claim 5, wherein each set of instructions in the plurality of sets of instructions is associated with different actions.

7. The method of claim 5, wherein a set of instructions is stored in a contiguous region of the memory unit and the contiguous region is identified by the address.

8. The method of claim 1, wherein the one or more actions further comprise updating the match table.

9. The method of claim 1, further comprising locking the match table for exclusive access by the match processing unit while the match table is processed by the match processing unit.

10. The method of claim 1, wherein the packets are processed in a stalling-free manner by distributing the table result to a plurality of match processing units.

11. An apparatus for processing packets comprising:
    a) a first memory unit having a plurality of programs stored thereon, wherein the plurality of programs are associated with a plurality of actions comprising modifying a header portion of a packet, updating a memory based data structure, or initiating an event;
    b) a second memory unit for receiving and storing a table result, wherein the table result is generated by i) selecting, from a plurality of tables, a match table based at least in part on packet type information or protocol information associated with a packet header vector contained in the header portion of the packet, or a table selection key, and ii) performing packet match operations to the packet header vector and data stored in the match table; and
    c) circuitry for executing a program selected from the plurality of programs in response to an address received by the apparatus and the table result, wherein the program is executed until completion and the program is associated with the match table.

12. The apparatus of claim 11, wherein the apparatus is configured to provide the modified header portion to a succeeding circuit.

13. The apparatus of claim 12, wherein the succeeding circuit is configured to assemble the modified header portion to a corresponding payload portion.

14. The apparatus of claim 11, wherein the plurality of tables are stored on a random-access memory (RAM) or a ternary content addressable memory (TCAM).

15. The apparatus of claim 11, wherein the match table is selected based on an ID of the match table selected by a preceding stage in a programmed pipeline for processing the packet.

16. The apparatus of claim 11, wherein each of the plurality of programs comprises a set of instructions stored in a contiguous region of the first memory unit, and the contiguous region is identified by the address.

17. A system comprising a plurality of apparatuses of claim 16, wherein the plurality of apparatuses are coordinated to perform the set of instructions or the plurality of actions concurrently or sequentially by distributing the table result to the plurality of apparatuses according to a configuration.

18. The system of claim 17, wherein the configuration is determined by an application instruction received from a main memory of a host device operably coupled to the plurality of apparatuses.

19. The system of claim 17, wherein the plurality of apparatuses are arranged to process a plurality of packets according to a pipeline of stages.

20. The system of claim 19, wherein the final stage of the pipeline is a DMA stage.

21. The system of claim 20, wherein the DMA stage is configured to execute DMA commands in order.

22. The system of claim 17, wherein the configuration is determined based on a length of the program.

23. The apparatus of claim 11, wherein the plurality of actions comprise updating the match table.

24. The apparatus of claim 11, wherein the circuitry is further configured to lock the match table for exclusive access by the apparatus while the match table is processed by the apparatus.

25. The apparatus of claim 11, wherein the event is not related to modifying the header portion of the packet.

26. The apparatus of claim 11, wherein the memory based data structure comprises at least one of the following: a management token, an administrative command, and one or more processing tokens for initiating an event.

* * * * *